United States Patent [19]

Stratienko

[11] 4,304,502

[45] Dec. 8, 1981

[54] TORQUE AND THRUST TRANSMITTING BUSHINGS

[76] Inventor: Andrew Stratienko, 8503 Elliston Dr., Philadelphia, Pa. 19118

[21] Appl. No.: 94,649

[22] Filed: Nov. 15, 1979

[51] Int. Cl.³ .......................... B25G 3/20; F16B 2/00; F16B 7/04
[52] U.S. Cl. ..................................... 403/370; 403/371
[58] Field of Search .................. 403/369, 370, 371

[56] References Cited

U.S. PATENT DOCUMENTS

| | | | |
|---|---|---|---|
| 2,043,272 | 6/1936 | Wallgren | 403/370 |
| 2,151,831 | 3/1939 | Buccicone | 403/370 |
| 2,784,606 | 3/1957 | Schilling | 403/370 X |
| 2,816,452 | 12/1957 | McCloskey | 403/369 |
| 2,849,886 | 9/1958 | McCloskey | 403/370 X |
| 3,638,974 | 2/1972 | Stratienko | 403/370 X |
| 3,957,381 | 5/1976 | Schäefer | 403/369 X |
| 4,202,644 | 5/1980 | Soussloff | 403/369 |

*Primary Examiner*—Wayne L. Shedd
*Attorney, Agent, or Firm*—Martin L. Faigus

[57] ABSTRACT

A linear torque and thrust transmitting wedge bushing (10, 100) for axially and rotationally securing a part (13, 120) to a circular cross-section shaft (11, 122) is positioned over the shaft within a circular cross-section opening of the part. The bushing includes inner and outer wedge rings (12 and 14; 106 and 108) concentrically disposed relative to each other and being radially expandable and contractible. The outer wedge ring has an outer axially straight surface (20), for engaging the inner surface defining the opening of the part, and the inner wedge ring has an inner axially straight surface (22) for engaging the outer surface of the shaft, characterized in that the wedge rings have engaging non-slip surfaces (16 and 18; 102 and 104) that are axially inclined at the same low angle of less than 10°, and further including a thrust member (28; 112) and loading member (30, 110) connected respectively to the outer wedge ring (14) and inner wedge ring (12) for cooperating with screw members (40 and 46; 118 and 126) to establish a positive thrust and torque transmitting grip between the shaft and part, and for releasing the grip when desired.

10 Claims, 4 Drawing Figures

TORQUE AND THRUST TRANSMITTING BUSHINGS

TECHNICAL FIELD

This invention relates to torque and thrust transmitting bushings, and more particularly to bushings of the type employing split inner and outer wedge rings for securing a part having a circular cross section opening to a circular cross section shaft, or other cylindrical member.

BACKGROUND ART

Self-releasing bushing of the type employing wedge rings with solid antifriction coatings thereon have been employed with commercial success to transmit thrust and torque between a hub and shaft without the use of conventional keys. Representative bushings of this type are disclosed in U.S. Pat. Nos. 3,501,183 and 3,638,974; both issued to Andrew Stratienko. The coated mating inclined surfaces of these bushings have a relatively low angle of inclination, on the order of 3°. This shallow wedge angle, in conjunction with the low-friction contact provided by the antifriction coating offers very little resistance to axial sliding movement between the inner and outer wedge rings. In fact the shallow wedge angle, low friction construction makes the wedge rings of the bushing both self-tightening and self-releasing, as is more fully explained in the '183 patent. In addition, only a low tightening force is required to obtain an extremely powerful grip between axially straight surfaces of the bushing and the machine element or part to be interconnected by said bushing. However, due to the fact that the engaged inclined surfaces of the inner and outer wedge rings are very slippery it is very desirable to employ a wedge ring rotational stop to engage the inner and outer wedge rings for preventing relative rotational motion between them under high load conditions. This introduces an additional element into the bushing construction, and also requires close manufacturing tolerances to permit positive torque transmission, particularly for preventing backlash when the elements that are interconnected by the bushing are intended to transmit cyclic, reverse loads.

To eliminate the need for using a rotational stop between inner and outer wedge rings of a keyless bushing it has been suggested to do away with the low friction coating on the engaging inclined surfaces of the wedge rings. One such bushing is sold under the trademark "TranTorque" by Manheim Manufacturing and Belting Co. of Manheim, Pa. In the TranTorque device the outer wedge ring is interconnected through a rib and groove arrangement with a single, concentric, annular nut having an internal threaded surface in threaded engagement with the outer periphery of an axially straight segment of an inner wedge ring. The annular nut has flats provided on its outer periphery that are adapted to be engaged with a torque wrench. Rotation of the nut in one direction will move the inner and outer wedge rings along their mating inclined surfaces for expanding the outer wedge ring and contracting the inner wedge ring to establish a thrust transmitting connection between a machine component or part and a shaft. Rotation of the nut in the opposite direction will release this connection.

Establishing torque capacity through the use of a single annular nut that has an internal threaded diameter larger than that of the shaft over which it is positioned imposes severe limitations on the use of the TranTorque bushing. Specifically, the wrench torque necessary to establish the desired axial force between the wedge rings is directly proportional to the diameter of the threaded surface through which the force is induced (i.e. the larger the diameter the larger the required wrench torque), and is inversely proportional to the number of threaded members (i.e. nuts, screws) through which the axial force can be divided (i.e. the smaller the number, the larger the required wrench torque).

The use of the single threaded nut to transmit axial force in the TranTorque bushing establishes wrench torque requirements that make it impractical, or undesirable for use on shafts having a diameter in excess of about $1\frac{1}{4}$ inches. Therefore, useage of the TranTorque bushing is relegated to relatively small systems.

Another keyless torque transmitting bushing employing wedge members that do not need to be interconnected by a rotational stop is manufactured by Dyna-Lok Inc. of Ringwood, N.J. This bushing includes inner and outer wedge members having mating tapered surfaces that are free of a low friction coating. To permit the bushing to be assembled the outer wedge member is made in the form of two separate rings segments, each of which is independently tightened by loading screws threadedly engaged within openings of a flange integrally formed as part of the inner wedge member. In view of the fact that the outer wedge member is formed of independently activated, discrete segments, the bushing is not a self-centering device, and will not provide a concentric connection between a shaft and hub. The necessity of forming the outer member of separate segments results from the fact that the inner member is provided with an integral flange adjacent the thin end, or low side of its inclined outer surface. Therefore a unitary outer member having a mating inclined inner surface cannot be positioned over the inner member from the side opposite the flange. Thus the necessity of forming the outer member in discrete segments.

Although the Dyna-Lok bushing does not include multiple loading screws for tightening it to firmly interlock a shaft to a hub member; it is not designed or constructed to include any releasing mechanism. Due to the fact that there is no releasing mechanism it often is necessary to remove the bushing by hammering, or otherwise pounding on it. This is a difficult operation, is impractical in large systems, and can damage the bushing.

In summary, although the Dyna-Lok bushing is capable of transmitting torque between a machine component and a shaft without employing a rotational stop between the inner and outer wedge members; it is neither self-centering nor self-releasing. Moreover, it does not include any arrangement to facilitate releasability.

Quick detachable bushings (referred to in the trade as QD-type bushings) are commonly employed with conventional keys to permit the mounting of the same sheave, sprocket, pulley or other machine element to slotted shafts of different diameters, or to permit the mounting of machine elements having different hub dimensions to the same slotted shaft. These QD-bushings include only a single split ring having an inclined outer surface for engaging an inclined inner surface defining an opening through the hub of the machine element. The inner surface of the ring is axially straight for receiving a shaft therethrough, and for tightening on the shaft when installed within the opening through the hub. In addition, the inner surface of the ring is provided with a keyway for receiving a corresponding key associated with the shaft. A flange is formed integrally with the bushing at one end thereof, and this flange is provided with a plurality of circumferentially spaced passages, some of which are adapted to be oriented in axial alignment with circumferentially spaced passages formed directly in the sheave, sprocket or other machine element. Cap screws cooperate with the axially aligned passages of the flange and machine element to tighten the bushing within the tapered opening in the hub. When the cap screws initially are directed through the machine element, and then into the bushing flange (standard mounting), the passages in the bushing flange are threaded to permit the cap screws to provide their tightening function. When the cap screws initially are directed through the bushing flange, and then into the sheave or pulley (reverse mounting), the passages in the sheave or pulley are threaded to permit the tightening action to be achieved.

In the standard mounting arrangement threaded passages also are formed in the machine element. These latter passages are in axial alignment with solid surfaces of the bushing flange to permit cap screws to thread into the machine element, and thereafter push the bushing out of the tapered opening through the hub when detachment of the bushing is desired. Obviously the cap screws employed to secure the bushing to the machine element must be removed in order to permit this separation to take place.

In the reverse mounting arrangement threaded passages through the bushing flange axially align with solid surfaces of the machine element to permit the use of cap screws to separate the bushing from the tapered opening through the hub. The manner in which this is accomplished is substantially the same as for releasing the standard mounting arrangement, and is not believed to require any further explanation.

In many sheaves, sprockets and other machine elements the hub section including the inclined inner surface is either located closer to one axial end than the other, or is otherwise unsymmetrical with respect to a central vertical plane through such machine elements. In some systems the desired position of these machine elements will dictate the axial orientation of the machine element on the shaft. This also will fix the orientation of the QD bushing relative to the components of the system because the bushing can only be inserted into the hub from one direction; dictated by the direction of inclination of the inner hub surface. The particular mounting arrangement that needs to be used (i.e. standard or reverse) is dictated by the position of the bushing elements relative to the other components of the system. Therefore, provision for both types of mountings should be made in the construction of the machine element by providing the necessary arrangement of threaded and unthreaded openings in the hub section to cooperate with appropriate openings in the flange of the QD bushing. This complicates the manufacturing of the machine element, and can also significantly weaken the hub section. Particularly, as compared to a machine element in which the hub section does not need to be provided with any such openings.

It is important that the taper of the inner hub surface of the machine element matches the outer inclined surface of the QD bushing, and also that the mounting openings in the bushing flange match with proper mounting openings in the hub. However, since the QD bushings are manufactured by a different source than the sheaves or pulleys, the manufacturing tooling needs to be matched by different entities. This is undesirable and can create tolerance problems.

Although the single ring QD type bushings are significantly different in construction and mode of operation from the dual wedge ring bushings forming the subject matter of the instant application, they have been referenced herein because the mechanism by which they are assembled with, and detached from a sheave or pulley might be regarded as similar to the mechanism employed in the instant invention. However, it is important to recognize that QD-type bushings include only a single tapered ring, and therefore do not teach any structural cooperation of elements for dual wedge ring constructions of the type constituting the instant invention, let alone the unique cooperation of the structural elements invented by applicant. Another extremely important point is that the sheaves or pulleys to which the QD-type bushings are secured are machine elements; not the equivalent of an expandable and contractible outer wedge ring of the type employed in the dual wedge ring bushings of this invention. In fact many of the skills, techniques and considerations employed in the manufacture of sheaves, pulleys and similar machine components are totally unrelated to the skills, techniques and considerations employed in the manufacture of dual ring power transmission bushings of the type forming the subject matter of the instant invention, and are actually manufactured by different sources.

DISCLOSURE OF INVENTION

A linear torque and thrust transmitting wedge bushing for keyless securing a part to a circular cross-section shaft is positioned within a circular cross-section opening of the part, said shaft having a smaller diameter than the opening through the part to provide an annular space for receiving said bushing. The bushing includes inner and outer wedge rings concentrically disposed relative to each other and being radially expandable and contractible, said outer wedge ring having an outer axially straight surface for engaging the surface defining the opening of the part and said inner wedge ring having an inner axially straight surface for engaging the outer surface of the shaft; characterized in that said wedge rings have engaging non-slip surfaces axially inclined at the same angle;

said outer wedge ring including a thrust member at one end thereof, said inner wedge ring having a portion which projects axially beyond said one end of the outer ring and including a loading member;

the loading member including a first set of spaced threaded openings for engaging with threads of axial screw members, and a second set of spaced openings through which threaded screw members can be directed without threaded engagement;

the thrust member including spaced, threaded openings adapted to be axially aligned with the second set of openings in the loading member for threadedly engaging the screw members directed through the second set of openings;

the screw members in threaded engagement with the first set of openings in the loading member being effective to apply an axial force between the inner and outer wedge rings to move said rings in a first axial direction relative to each other; and the screw members threadedly engaging the axially aligned passages in the thrust member being effective to apply an axial force between the inner and outer wedge rings to move said rings relative to each other in a second axial direction opposite said first axial direction.

The movement of the wedge rings relative to each other in one of the axial directions is effective to cause the inner ring to contract and grip the shaft, and the outer ring to expand and grip the surface defining the opening of the part. This will secure the shaft and part together for transmitting both thrust and rotational forces between them. Movement of the wedge rings relative to each other in the opposite axial direction is effective to permit contraction of the outer wedge ring and expansion of the inner wedge ring for releasing the force transmitting interconnection between the shaft and part.

Reference throughout this application to a "set" of openings or passages in thrust or loading members of the bushings of this invention means two or more of such openings or passages unless specifically limited to a different number.

The bushings of this invention are uniquely different from the self-releasing slippery surfaced bushings of the type covered in applicant's earlier referenced patents (U.S. Pat. Nos. 3,501,183 and 3,638,974), and operate on an entirely different principle. The bushings of this invention are not the self-tightening and self-releasing types described in detail in the '183 patent, and therefore do not provide an interrelationship among the coefficient of friction of the inclined surface, the coefficient of friction of the axially straight surfaces and the magnitude of the angle of inclination of the inclined surfaces to provide a self-releasing and self-tightening action.

The bushings of this invention are provided with inner and outer wedge rings having low inclination (less than 10 degrees), non-slip engaging surfaces that are capable of transmitting both thrust and rotational forces between the wedge rings without slippage, and without the necessity of interconnecting the rings with rotational stops or similar extraneous members. Moreover, although this is achieved at the expense of the self-releasing feature associated with bushing constructions having slippery inclined surfaces, a unique arrangement of elements is provided for achieving easy releasability of the bushings from the parts they interconnect. In addition, the bushings of this invention have the advantage of being usable with smooth-surfaced shafts that are free of keyways, splines, hubs and similar elements, while still permitting the bushings to interconnect the shaft with a hubbed part to positively transmit thrust and rotational forces between them without any slippage. However, it is within the scope of this invention to include a key to fill in slots that can be included in the inner and outer wedge rings of this invention to eliminate static or dynamic imbalance in the system; particularly at high speeds, or for other purposes.

In one embodiment of this invention the non-slip axially inclined surfaces of the inner and outer wedge rings are inclined upwardly in a direction away from the thrust and loading members thereof. In this embodiment the inner and outer wedge rings initially can be moved, or expanded into engagement with contiguous surfaces of the shaft and hubbed part, respectively, while maintaining the sides of the thrust and loading members in engagement with each other. Thereafter, jack screws are employed to move the wedge rings along their inclined surfaces to form a tight grip with the shaft and hubbed part while moving the thrust and loading members apart. This movement creates a gap between the thrust and loading members that is proportional to the magnitude of wrench torque, and therefore can be used as a direct reading of the wrench torque necessary to establish the desired torque capacity between the shaft and hubbed part.

In an alternative embodiment of this invention the engaging non-slip axially inclined surfaces of the inner and outer wedge rings are axially inclined upwardly in a direction toward the thrust and loading members. In this embodiment the loading member either engages or is integrally formed with the thick end of the tapered inner wedge ring. As will be explained hereinafter, this permits the inner wedge ring to be formed thinner than the inner wedge ring of the first embodiment of the invention; thereby permitting the overall radial dimension of the bushing to be reduced. Other advantages of this embodiment of the invention will be described in greater detail hereinafter.

A modification that can be employed in connection with the last-mentioned embodiment of the invention (i.e. the embodiment wherein the non-slip axially inclined surfaces are inclined in a upward direction toward the thrust and loading members) is the provision of a hub-engaging member associated with the loading member of the inner wedge ring. This hub-engaging member can be integrally machined as part of the loading member, can be welded to the loading member, or can be completely separate from, but engageable by the loading member. In addition the hub-engaging member extends axially beyond the thrust member of the outer wedge ring to engage a side surface of the hub-bed part that is being connected to the shaft. This prevents the hubbed part from moving with the outer wedge ring, relative to the shaft, during the tightening operation.

The bushings of this invention can be used in a manner similar to Q-D bushings, as interchangeable bushings with sheaves, sprockets, pulleys or other machine elements having cylindrical, non-tapered hub bores. This permits the bushing to be inserted into the bore from either axial side without in any way dictating the axial orientation of the machine element on a shaft. This eliminates the need for both standard and reverse mounting provisions in the bushings. Moreover, since the releasing and tightening features are associated with the two rings of the bushing, there is no need for providing any drilled and tapped mounting holes in the hub of the machine element. The elimination of the tapered hub bore and mounting holes from the construction of the machine element results in considerable savings to the manufacturer by eliminating the need for complex and expensive machining. Moreover, the elimination of mounting holes in the hub of the machine element provides a stronger, "meatier" hub. This will permit a stronger tightening of the bushing to the machine element without cracking or splitting the hub, and therefore greater torque can be transmitted between the machine element and shaft without the need for "keying" the shaft and bushing together.

Other objects and advantages of this invention will become apparent by referring to the following description, taken in conjunction with the drawings.

BEST MODE FOR CARRYING OUT THE INVENTION

Figure 1:
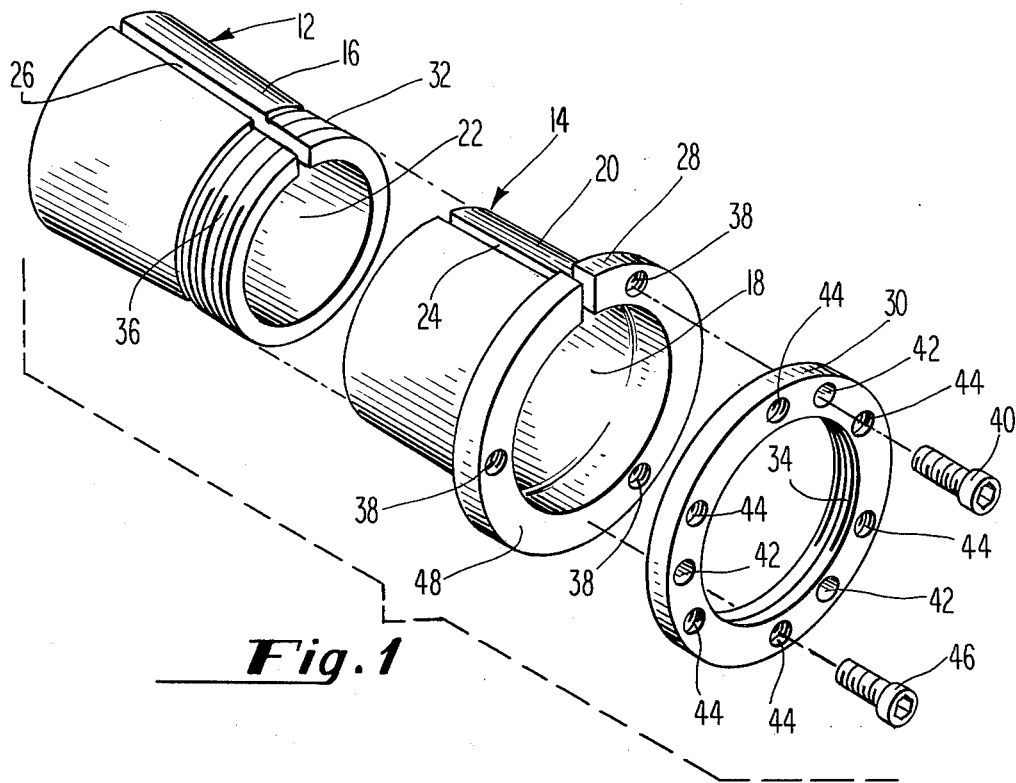
FIG. 1 is a exploded isometric view of one embodiment of a keyless torque and thrust transmitting wedge bushing of this invention.

Referring to FIG. 1, the various components of a torque and thrust transmitting wedge bushing 10 of this invention are most clearly illustrated. These components are shown positioned on an axis which is the center axis of a shaft on which a hubbed part (e.g. gear, bearing, cam, pulley and the like) is to be mounted.

Figure 2:
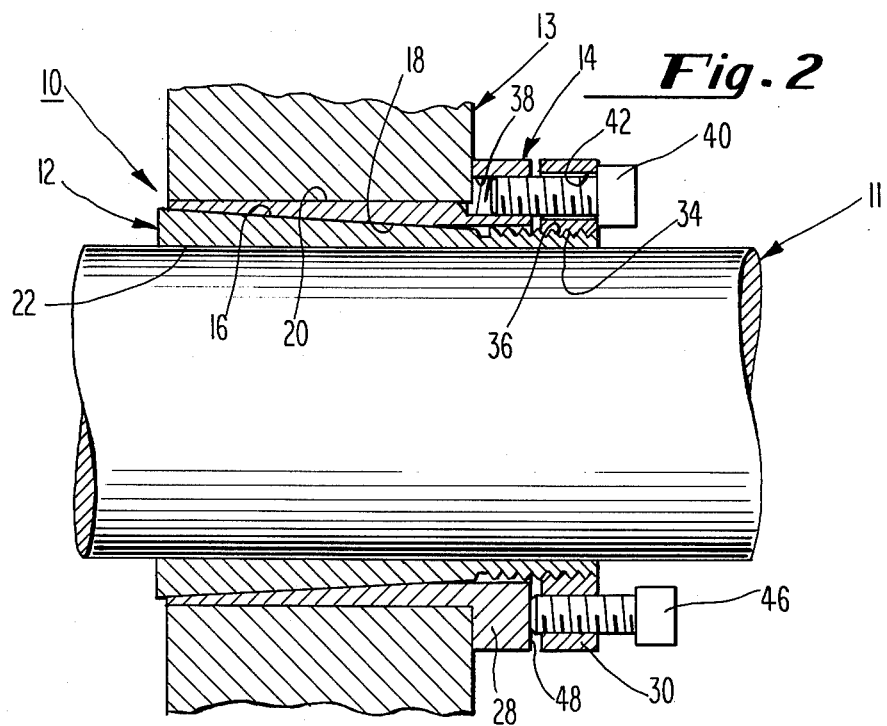
FIG. 2 is a sectional view of the bushing depicted in FIG. 1 installed to secure a part on a smooth-surfaced shaft, and further showing the arrangement of elements for securing and releasing the bushing.

Referring to FIGS. 1 and 2, the torque and thrust transmitting wedge bushing 10 includes a resilient inner wedge ring 12 and a resilient outer wedge ring 14. The inner ring includes an axially inclined outer surface 16, and the outer ring includes an axially inclined inner surface 18. The surfaces 16 and 18 are axially inclined at the same angle and, unlike the self-releasing bushings covered in earlier-referenced U.S. Pat. Nos. 3,501,183 and 3,638,974, hereby made of record in this application, these inclined mating surfaces are not provided with an antifriction coating. In other words, these mating surfaces are designed to establish a non-slip frictional connection between the inner and outer wedge rings 12 and 14 to transmit torque, without slippage, when the bushing is connected to the shaft and hubbed part.

The angle of inclination of the mating surfaces 16 and 18 is small, typically less than 10 degrees. In the most preferred embodiments of this invention the angle of inclination is between 2 and 4 degrees. Since the angle of inclination is small the wedge rings can be made relatively thin and long. Therefore, for many applications the bushing can be made axially long enough to extend through substantially the entire axial distance of a shallow annular space provided between the outer periphery of a substantially cylindrical shaft 11, and the inner periphery defining a cylindrical passage through a hubbed part 13 (FIG. 2).

The outer wedge ring 14 includes an axially straight outer surface 20 for gripping the inner periphery of the substantially cylindrical passage through the hubbed part 13. The inner wedge ring 12 includes an axially straight inner surface 22 for gripping the outer periphery of a substantially cylindrical shaft 11. Preferably the outer wedge ring is split at 24, and the inner wedge ring is split at 26. Splitting these rings helps them expand and contract radially in response to applied axial forces that cause the rings to move axially relative to each other. Moreover, the inner and outer rings are of a unitary construction so that they will contract and expand uniformly around their circumference to automatically center the hubbed part on the shaft.

Referring to FIG. 2, a thrust member in the form of an annular flange 28 is unitarily formed on the thick end of the outer wedge ring 14 (the right end as viewed in FIG. 2). This thrust member is axially and radially aligned with a loading member in the form of an annular collar 30 secured to an axially straight section 32 of the inner wedge ring 12. Securement preferably is achieved through cooperating threads 34, 36 associated with the inner periphery of the collar 30 and the outer periphery of the wedge ring 12, respectively.

Referring to FIGS. 1 and 2 the thrust member 28 is provided with a set of three circumferentially spaced threaded openings 38 for receiving releasing screws 40, only one of which is shown in FIG. 2 (i.e. screws adapted to release the axial thrust and radial torque gripping forces established among the bushing 10, shaft 11 and hubbed part 13).

In order to permit the releasing screws 40 to be received within the threaded openings 38, the annular loading collar 30 is provided with circumferentially spaced, unthreaded openings 42 that are adapted to be axially aligned with the openings 38 in the thrust flange 28. In other words, the circumferential spacing between the unthreaded openings 42 preferably is the same as the circumferential spacing between the openings 38. However, these openings do not have to be axially aligned with each other until it is desired to release the bushing 10.

Referring to FIGS. 1 and 2, a plurality of circumferentially spaced threaded openings 44 are also included in the loading collar 30; six being shown in the illustrated embodiment. These openings are adapted to threadedly connect with tightening jack-screws 46 (only one of which is shown FIG. 2) to engage a flat surface 48 of the thrust member 28. These jack-screws 46, when rotated to push against the surface 48, will move the inner and outer wedge rings along their mating inclined surfaces to contract the split ring into tight engagement with the cylindrical shaft 11 and to expand the outer ring into tight engagement with the interior periphery of the bore through the hubbed part 13.

Although the bushing 10 is depicted as including three openings 38 to receive releasing screws 40 and six openings 44 to receive tightening screws 46, the specific number of these openings is not a limitation on the present invention. However, it is desirable that at least two openings 44 be provided for the tightening operation. It is also desirable to provide at least two openings 38 so that at least two screws 40 can be employed in the releasing operation.

The arrangement of releasing screws described above permits easy release of the bushing 10, even though the mating surfaces 16 and 18 of the wedge rings have a small angle of inclination and are free of any low friction coating such as Teflon.

The arrangement of tightening screws 46 permits dividing of the wrench torque necessary to establish a desired torque capacity. In fact, in the illustrated embodiment employing six tightening screws having threaded diameters of ½ inch, the wrench torque necessary to establish a desired torque capacity with a 2 inch diameter shaft is, by calculation, approximately 40–50 times less than that needed when utilizing the Tran-Torque device.

The bushing 10 of this invention will transmit torque without backlash between the elements they interconnect and without the necessity of providing a rotational stop between the wedge rings. Moreover, this torque transmitting capability is achieved without sacrificing easy releasability.

The manner in which bushing 10 is used will now be described.

The outer wedge ring 14 is positioned concentrically over the inner wedge ring 12 with its inner surface 18 in mating engagement with the inclined outer surface 16 of the inner ring. This is achieved by sliding the outer ring 14 over the inner ring 12 from the right side of the inner ring, as viewed in FIG. 2, and prior to securing the threaded loading collar 30 onto the inner ring. The direction of inclination of the mating surfaces of the wedge rings dictates this method of assembly. After the rings have been assembled the bushing can be loosely fitted into the annular space between the cylindrical shaft 11 and the hubbed part 13. Thereafter the outer loading collar 30 is rotated to move it axially along the inner wedge ring 12 into engagement with the flat end surface of the thrust flange 28. Thereafter further rotation of the collar 30 will cause the inner and outer rings to move axially relative to each other to expand the outer ring into contact with the periphery of the opening through the hubbed part 13, and to contract the inner wedge ring into contact with the shaft 11. This takes the slack out of the annular chamber, and requires a very low wrench torque to accomplish. Also, in this condition the confronting surfaces of the loading collar 30 and thrust flange 28 are in engagement with each other. The bushing 10 is now in position to permit it to be tightened against the shaft 11 and hubbed part 13 for transmitting torque and thrust forces between them. One common method of applying the required wrench torque to establish the desired torque capacity is to use a torque wrench to tighten the screws 46 against the flat surfaces of the thrust flange 28. An alternative method of applying the required wrench torque is disclosed in U.S. Pat. No. 3,638,974, discussed earlier in connection with the prior art, and also made of record in this application. In the bushing disclosed in the 3,638,974 patent a plurality of disc springs are positioned between a loading collar 31 and a thrust collar 32. These springs are designed so that they will flatten out when the required wrench torque has been applied. Although the 3,638,974 system does not require the use of torque wrenches to establish the desired torque capacity, it does require the use of separate spring means, thereby introducing additional elements into the bushing construction.

In the present invention the tightening of bushing 10 is achieved by establishing relative axial movement between the rings 12 and 14 in a direction which moves the thrust flange 28 away from the loading collar 30. In fact, the space, or gap established between the flange and collar is directly related to the wrench torque that is applied to the tightening screws. Accordingly, this spacing is a direct indication of the applied wrench torque, and can be used as the parameter for applying the required wrench torque to the bushing. This eliminates the need for using torque wrenches to establish the desired tightening force without the introduction of springs or similar force indicating mechanical elements into the bushing construction.

The dual wedge ring bushing 10 of this invention will positively transmit torque without the need for providing a rotational stop of the type that is employed in bushings including inner and outer wedge rings having mating inclined surfaces provided with slippery coatings. Moreover, the transmission of rotational torque with the bushing 10 is achieved without backlash, even when the rotational motion is cyclic, or oscillatory. These advantages are achieved in a bushing that can easily be tightened and released while maintaining a low angle of inclination of less than 10 degrees between the confronting, non-slip axially inclined surfaces of the wedge rings 12 and 14, respectively.

Figure 3:
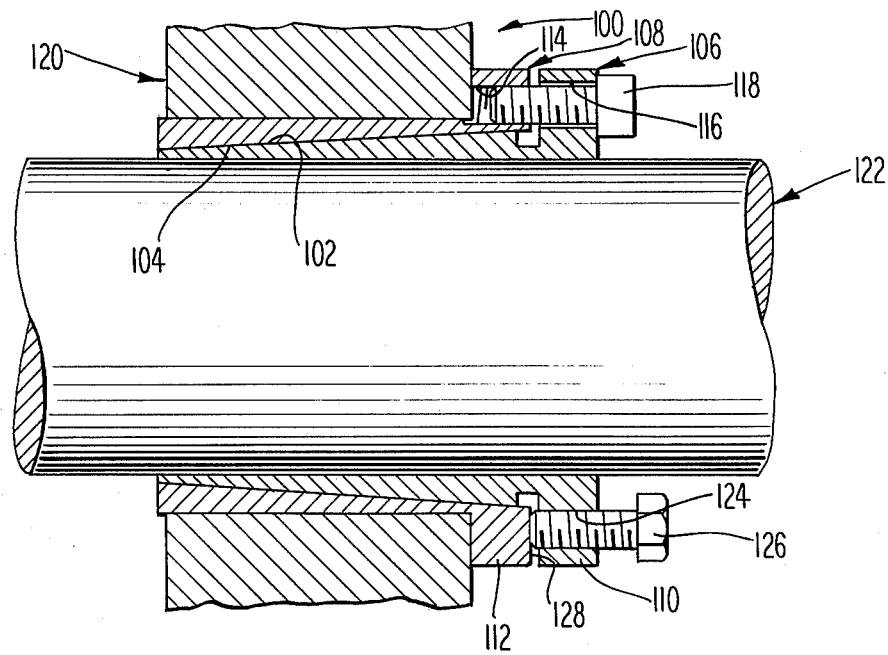
FIG. 3 is a sectional view showing an additional embodiment of a torque and thrust transmitting bushing installed for securing a part on a smooth-surfaced shaft.

Referring to FIG. 3, an additional embodiment of a bushings 100 in accordance with this invention is shown. In this embodiment the taper, or angle of inclination of mating surfaces 102 and 104 of split inner and outer wedge rings 106 and 108, respectively, are reversed, as compared to the bushing 10 showing in FIGS. 1 and 2. In the bushing 100 a loading member 110 is in the form of a flange integrally formed with the inner wedge ring 106. However, the loading member can also be in the form of a separate threaded collar of the type employed in bushing 10.

Forming the loading member as an integral flange 110 is possible because the reverse taper permits the outer wedge ring 108 to be positioned over the inner wedge ring 106 from the side opposite the loading member. This is not the case when the taper is in the opposite direction, as in the bushing 10. The bushing 100 also includes a thrust member 112, in the form of a split flange integrally formed with the outer wedge ring 108.

The bushing 100 is tightened and released in a manner opposite to that of the bushing 10. Specifically, the annular thrust flange 112 is provided with a set of two or more uniformly circumferentially spaced threaded openings 114 adapted to be aligned with a set of circumferentially spaced unthreaded openings 116 in loading member 110 (only one opening 114 and one opening 116 being shown at the upper right in FIG. 3). Preferably six such openings 114 and 116 are provided, but the invention is not so limited. Tightening screws 118 are provided to extend through the set of openings 116 in the loading member and into threaded engagement with the axially aligned openings 114 in the thrust flange 112. These screws 118 are connected to move the outer wedge ring 108 along the inclined surface 102 of the inner wedge ring 106 by pulling the thrust flange 112 toward the loading member 110. This will expand the outer ring into engagement with the inner periphery of the passageway through the hubbed part 120 and will contract the inner ring into tight engagement with the outer periphery of shaft 122.

In order to release the bushing 100 the inner and outer wedge rings 106 and 108 need to be moved relative to each other in an axial direction opposite to that of the wedge rings in the bushing 10.

The releasing mechanism for the bushing 100 includes a set of uniformly circumferentially spaced threaded openings (one being shown at 124 at the lower right in FIG. 3) in the loading flange 110 to receive releasing screws (one screw being shown at 126 in FIG. 3). These releasing screws 126 are threaded into engagement with a flat surface 128 of the thrust flange 112 to move the inner and outer wedge rings in an axial direction that separates them, i.e. that spaces the thrust flange 112 from the loading member 110.

A reverse taper bushing, such as that depicted at 100, has several advantages over the direct taper bushing 10 shown in FIG. 1. First, the reverse taper arrangement permits the loading member 110 to be assembled or integrally formed at the thickest end of the tapered inner wedge ring 106. Thus, the thinnest portion of the inner wedge ring is not relied upon to carry the load of the loading member 110 as is the case with bushing 10. This permits the inner wedge ring 106 to be formed thinner than the inner wedge ring 12 of the bushing 10. To further explain when the bushing is designed with a direct taper, as in the bushing 10, the loading collar 30 is supported at the thin end of the tapered inner wedge ring 12. Since this end of the wedge ring needs to withstand the forces imparted to it through the loading collar, it needs to be somewhat thicker than the thin end of the inner wedge ring 106 of the reverse taper bushing 100. This will increase the overall thickness of the inner wedge ring 12 relative to wedge ring 106, and accordingly will increase the overall thickness of the bushing 10, as compared to the bushing 100. Thus, the bushing 100 can be received within a smaller annular space than the bushing 10. This provides a design advantage by permitting the hub of the machine element to be made thicker, and thereby stronger than the hub of the same size machine element being employed with the bushing 10.

An additional advantage of the bushing 100 resides in the manner in which it is tightened. Specifically, the tightening action is achieved by pulling the inner and outer wedge rings toward each other through the threaded interconnection between the tightening screws 118 and the threaded openings 114 in the thrust flange 112, rather than by "jacking" them apart, as in the bushing 10. Jacking the bushing apart can either mar or damage the engaging surfaces of the thrust flange 28 and tightening screws 46. This will not occur when a threaded interconnection is employed in the tightening operation to pull the inner and outer rings toward each other, as is the case with the bushing 100.

The tightening screws 118 employed in the bushing 100 need to be long enough to be received within the threaded openings 114 of the thrust flange 112, when the heads of these screws are in contact with the loading member 110. Therefore, these same screws are long enough to be employed in the releasing operation.

Figure 4:
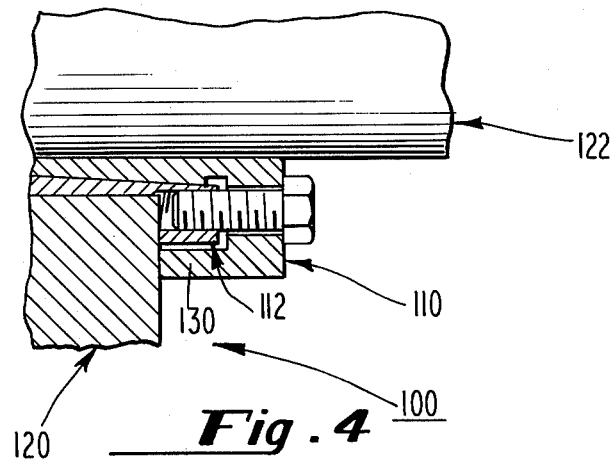
FIG. 4 is a fragmentary sectional view of a further modification that can be employed in connection with the embodiment of the bushing showing in FIG. 3.

Referring to FIG. 4, a modification that can be employed with the bushing 100 is illustrated. Specifically, the loading flange 110 includes a hub-engaging stop member 130, and this stop member overlies the thrust flange 112 for engaging the side wall of a hubbed part 120. The member 130 prevents the hubbed part from moving axially with the outer wedge ring 108, relative to shaft 122, as the bushing is being tightened. If desired, the stop member 130 can be integrally machined as part of the flange 110, or it can be formed as a separate ring between the flange 110 (which needs to extend radially beyond flange 112) and the hubbed part 120.

The bushings of this invention accomplish positive keyless thrust and torque transmission without the necessity of employing rotational stops of the type required to avoid backlash when slippery coatings are employed between engaging, axially inclined surfaces of inner and outer wedge rings. Moreover, applicant has achieved this result in bushings employing low angle of inclination contacting surfaces between the wedge rings (less than 10 degrees, and more specifically between 2 degrees and 4 degrees) while still providing for the positive and reliable release of the bushings. Moreover in certain embodiments the spacing between members associated with the inner and outer wedge rings are directly correlatable to the wrench torque applied to the tightening screws. Therefore, the required wrench torque to establish the desired torqued capacity can be determined on the basis of the spacing between members connected to the inner and outer wedge rings, rather than having to use a torque wrench, which may not always be available.

What I claim as my invention is:

1. A linear torque and thrust transmitting wedge bushing for axially and rotationally securing a part to a circular cross section shaft is positioned within a circular cross section opening of the part, said shaft having a smaller diameter than the opening through the part to provide an annular space for receiving said bushing, said bushing including:
    inner and outer wedge rings concentrically disposed relative to each other and being radially expandable and contractible;
    said outer wedge ring having an outer axially straight surface for engaging the surface defining the opening of the part;
    said inner wedge ring having an inner axially straight surface for engaging the outer surface of the shaft; characterized in that
    said wedge rings have engaging non-self-releasing surfaces axially inclined at the same angle;
    a thrust member in the form of an annular flange joined to one end of said outer wedge ring and located axially beyond the annular space between the shaft and part, said thrust member extending radially beyond the outer axially straight surface of said outer ring, said inner wedge ring having a portion which projects axially beyond said one end of the outer ring and including an annular loading member extending in a radially outward direction to overlie the thrust member externally of said annular space between the shaft and part;
    the loading member including a first set of spaced threaded openings for engaging with threads of screw members, and a second set of spaced openings through which threaded screw members can be directed without threaded engagement;
    the thrust member including spaced threaded openings adapted to be axially aligned with the second set of openings in the loading member for threadedly engaging the screw members directed through the second set of openings;
    the screw members in threaded engagement with the first set of openings in the loading member being effective to apply an axial force between the inner and outer wedge rings to move them in a first axial direction relative to each other;
    the screw members threadedly engaging the axially aligned passages in the thrust member being effective to apply an axial force between the inner and outer wedge rings to move them relative to each other in a second axial direction opposite said first axial direction;
    whereby axial movement of the wedge rings relative to each other in one axial direction is effective to cause the inner ring to contract and grip the shaft and the outer ring to expand and grip the surface defining the opening of the part to thereby secure the shaft and part together for transmitting both thrust and rotational forces, and axial movement of the wedge rings relative to each other in the opposite axial direction being effective to permit contraction of the outer wedge ring and expansion of the inner wedge ring for releasing the force transmitting interconnection between the shaft and part.

2. The torque and thrust transmitting bushing of claim 1 characterized in that the engaging non-self-releasing axially inclined surfaces of the inner and outer wedge rings define a truncated cone tapering radially outward from the thrust and loading members, the screw members adapted to be threadedly received within the first set of passages in the loading member being effective to engage the annular thrust member to move the outer and inner wedge rings axially relative to each other to tighten the bushing on the shaft and part while moving the loading and thrust members away from each other, the screw members adapted to be directed through the second set of openings in the loading member into threaded engagement with the axially aligned threaded openings in the thrust member being effective to move the inner and outer wedge rings relative to each other to release the force transmitting interconnection between the shaft and part.

3. The torque and thrust transmitting bushing of claim 2 wherein the loading member is an annular collar having an internally threaded passage that threadedly engages with threads on the periphery of the portion of the inner wedge ring that projects axially beyond the thrust member of the outer ring, said collar being rotatable about its threaded connection to move it axially into engagement with the thrust member; thereafter moving the inner and outer wedge rings relative to each other to take up any slack existing between the bushing and the annular space between the shaft and part in which the bushing is received, and thereafter to permit use of the spacing between the collar and thrust member as an indicator of the tightening limits.

4. The torque and thrust transmitting bushing of claim 1 wherein the engaging-nonself-releasing axially inclined surfaces of the inner and outer wedge rings define a truncated cone tapering radially inward from the thrust and loading members, whereby the screw members adapted to threadedly engage the threaded passages of the thrust member function to tighten the bushing to the shaft and part, and the screw members that threadedly engage the spaced-apart openings in the loading member function to release the force transmitting interconnection between the shaft and the part.

5. The torque and thrust transmitting bushing of claim 4 wherein the loading member is a flange integrally formed as part of the inner wedge ring.

6. The torque and thrust transmitting bushing of claim 4 including a part-engaging member associated with the loading member for engaging a side surface of the part to be connected to the shaft to prevent axial displacement of the part relative to the shaft.

7. The torque and thrust transmitting bushing of claim 4, wherein the loading member is an annular collar having an internally threaded passage that threadedly engages with threads on the periphery of the portion of the inner wedge ring that projects axially beyond the thrust member of the outer ring.

8. The torque and thrust transmitting bushing of claim 1 wherein the angle of inclination of the non-self-releasing surfaces is less than 10 degrees.

9. The torque and thrust transmitting bushing of claim 1 wherein the thrust and loading members are annular.

10. The torque and thrust transmitting bushing of claim 9 wherein the angle of inclination of the non-self-releasing surfaces is less than 10 degrees.

* * * * *